United States Patent [19]
Waters

[11] 4,042,063
[45] Aug. 16, 1977

[54] AIR CUSHION SHEAR WAVE VIBRATOR

[75] Inventor: Kenneth H. Waters, Ponca City, Okla.

[73] Assignee: Continental Oil Company, Ponca City, Okla.

[21] Appl. No.: 621,440

[22] Filed: Oct. 10, 1975

[51] Int. Cl.² .............................................. G01V 1/14
[52] U.S. Cl. .................... 181/119; 181/113; 181/106; 340/15.5 SW
[58] Field of Search .............. 181/102, 105, 108, 113, 181/114, 119, 121; 340/15.5 SW

[56] References Cited

U.S. PATENT DOCUMENTS

| | | | |
|---|---|---|---|
| 2,760,591 | 8/1956 | White | 181/119 |
| 3,159,232 | 12/1964 | Fair | 181/119 |
| 3,205,971 | 9/1965 | Clynch | 181/114 |
| 3,221,833 | 12/1965 | Malmberg | 181/106 |
| 3,346,066 | 10/1967 | Miller, Jr. | 181/106 |
| 3,716,111 | 2/1973 | Lavergne | 181/113 |

*Primary Examiner*—Howard A. Birmiel
*Attorney, Agent, or Firm*—William J. Miller

[57] ABSTRACT

A shear wave vibrator is constructed having a frame with first and second oppositely facing plenum chambers secured to the frame and each having an outer periphery. A skirt is attached to each of the outer peripheries. A fan is attached to the frame with conduits supplying a volume of air under pressure to each of the plenum chambers. A modulation apparatus is mounted in each of the first and second plenum chambers to cause a variation in air pressure in each of the plenum chambers in accordance with a predetermined signal in a manner to cause the air pressure in one chamber to decrease at the same instant the air pressure in the oppositely facing chamber is increasing and vice versa. The entire apparatus is mounted between opposite walls of a trench.

5 Claims, 4 Drawing Figures

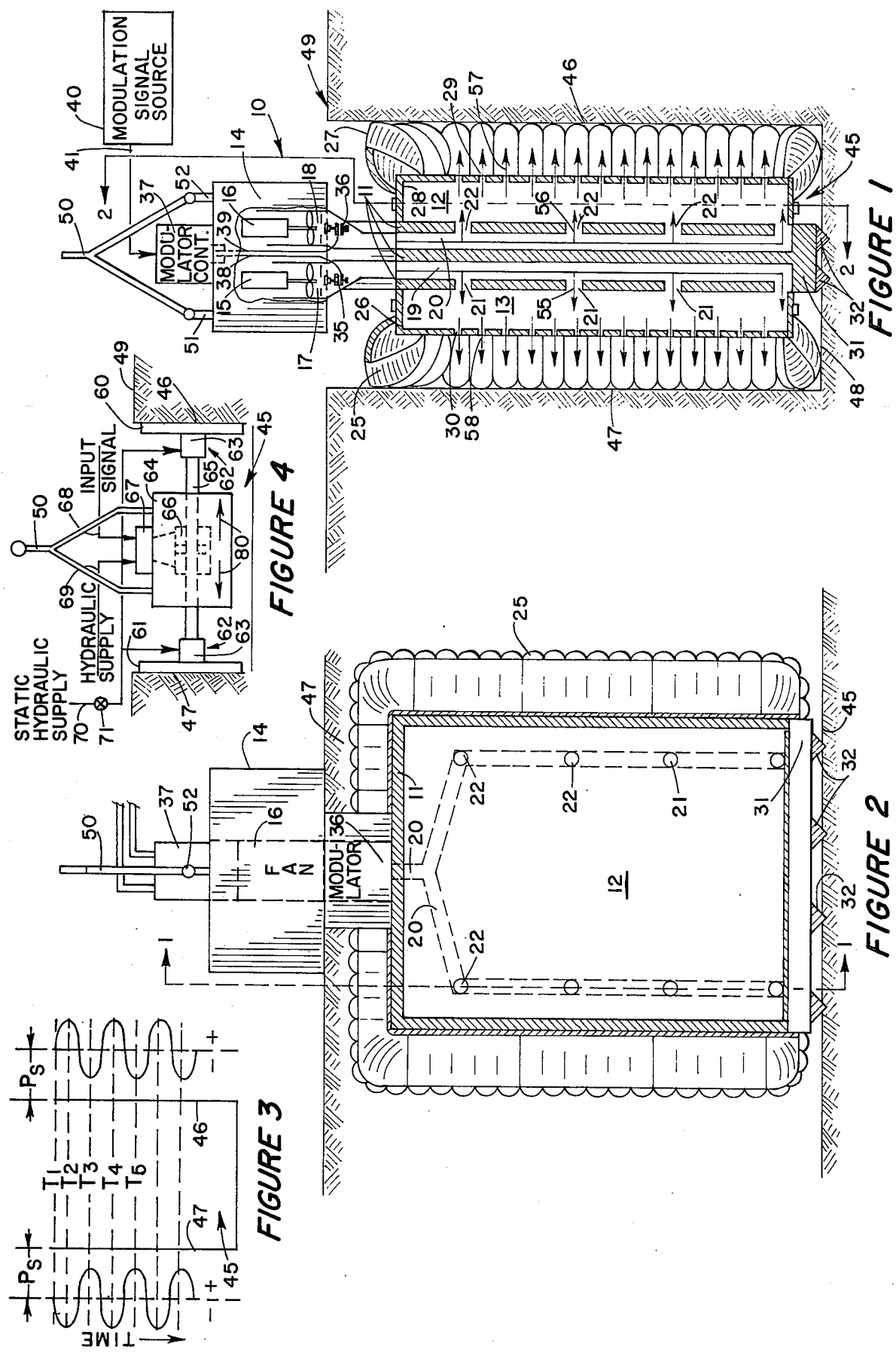

AIR CUSHION SHEAR WAVE VIBRATOR

BRIEF DISCUSSION OF THE PRIOR ART

Shear wave vibrators mounted on the surface of the earth are well known in the art. Examples of such vibrators are illustrated in U.S. Pat. Nos. 3,159,232; 3,159,233; and 3,286,783. These vibrators essentially comprise a base plate having a ground engaging means under the base plate and a mass adapted to move horizontally attached to the upper surface of the base plate. As the mass moves back and forth along an axis, the forces are transferred through the ground engaging means to the surface of the earth, causing a shear wave to be generated.

Some seismic generators have been mounted in a trench or bore hole. An example of these patents is U.S. Pat. Nos. 3,282,371; 3,034,594; and 3,718,205. Each of these patents basically illustrates apparatus having oppositely facing pistons and means for forcing the pistons apart and together against the walls of the trench or bore hole in order to create a seismic wave. Since the pistons are operated by applying simultaneous increase or decrease in pressure to the walls, a pressure wave (P wave) rather than shear wave (S wave) is generated. P wave vibrators have been developed using the air cushion principle, and such vibrators are illustrated in the patent to Broding U.S. Pat. No. 3,701,986 and the patent to Miller U.S. Pat. No. 3,727,717. None of these patents disclose a means for generating a shear wave with the air cushion principle.

BRIEF DESCRIPTION OF THE INVENTION

This invention contemplates a shear wave vibrator which is adapted to be lowered in a trench. Oppositely facing plenum chambers have skirts attached around their periphery which are in contact with the oppositely facng trench walls. A source of air is conveyed into each of the plenum chambers to cause air pressure against the trench walls. A modulator is interposed in the air flow either into the chambers or out of the chambers and operates to cause an increase in one plenum chamber and a simultaneous decrease in the remaining plenum chamber or vice versa. Thus, for example, if a sine wave is being supplied to the modulator, the air pressure will vary in the respective plenum chambers with a phase difference of 180°. The modulator or modulators can operate in the manner disclosed in the Broding patent referred to above by interrupting the flow of air into the plenum chambers in accordance with some predetermined signal. It is obvious, of course, that the modulators can be mounted in the plenum chambers themselves and permit air to escape into the atmosphere in accordance with some predetermined signal change, thereby causing a variation in the pressure of the plenum chambers.

BRIEF DESCRIPTION OF THE FIGURES

FIG. 1 is a cross-sectional view of the vibrator taken through lines 1—1 of FIG. 2;

FIG. 2 is a cross-sectional view of the shear wave vibrator taken through lines 2—2 of FIG. 1;

FIG. 3 is a chart showing the variation in air pressure versus time against the oppositely facing walls of the trench; and FIG. 4 is a hydraulic embodiment of the invention.

DETAILED DESCRIPTION OF THE INVENTION

Referring to all of the figures but in particular to FIGS. 1 and 2, a shear wave vibrator, generally referred to as 10, is illustrated and essentially comprises a frame 11 having a first plenum chamber 12 and a second plenum chamber 13 attached thereto. A housing 14 is connected to frame 11 and contains a pair of fans, for example, 15 and 16, which are connected to a source of power (not shown). The fan output is coupled to a pair of air ducts 17 and 18 to air passages 19 and 20, respectively, of frame 11. The air passes from ducts 19 and 20 out a plurality of openings 21 and 22, respectively, and into plenum chambers 13 and 12, respectively. A skirt 25 is attached around the periphery 26 of plenum chamber 13 in any suitable manner. Likewise a skirt 27 is attached around periphery 28 of plenum chamber 12 in any suitable manner. The attachment of a skirt to plenum chambers is well known in the art in the hover craft field and needs not be elaborated on in this specification.

Each plenum chamber 12 and 13 contains a plurality of openings 29 and 30, respectively, positioned to direct air into the skirt, causing it to inflate in the proper manner. The plenum chamber will also be designed in accordance with the usual air cushion principles generally having a center opening for the passage of air into the region where air pressure is desired to be applied.

At the bottom of frame 11 is a base 31 having ground engaging means 32 attached thereunder. The operation of the ground engaging means will be described subsequently.

In ducts 19 and 20 are mounted a pair of modulators 35 and 36, respectively. These modulators may be similar to those described in the Broding U.S. Pat. No. 3,701,968; and, therefore, their design and operation will not be elaborated on in this specification.

Modulator control system 37 is coupled through wires 38 and 39 to modulators 35 and 36, respectively. A system for generating a modulation source 40 is coupled through a wire 41 to the modulator system 37. The modulator source 40 can be a digital sweep system, a tape recording, or any other well known method for generating a predetermined signal. It may be coupled directly or through a radio to the modulator system 37.

A trench 45 has side walls 46 and 47 and a bottom 48 and is formed below the surface 49 of the earth. The distance between the surface of the earth and the bottom 48 of trench 45 is sufficient to contain the entire vibrator 10 and the skirt 25 when inflated.

Vibrator 10 is inserted into and removed from trench 45 by means of a lift apparatus 50 secured at 51 and 52 to housing 14.

OPERATION

The shear wave vibrator 10 operated in the following manner:

Basically the method for generating a shear wave into the earth requires that the pressure on one wall, for example 47 of trench 45, must be increasing (or decreasing) at the same time the pressure on wall 46 of trench 45 is decreasing (or increasing). In summary, the pressures being applied to walls 47 and 46 must be 180° out of phase.

The above is accomplished by generating a steady state air pressure by operating fans 15 and 16 which force air under pressure down ducts 19 and 20 into plenum chambers 13 and 12, respectively, in the direction of arrows 55 and 56. Air is then forced through opening 29 in the direction of arrows 57 and 58, respectively causing the inflation of skirts 27 and 25, respectively. Once the skirts are inflated, a steady state air pressure will be applied against trench walls 46 and 47. A modulation signal is then generated by modulation source 40 and applied through wire 41 to modulator control 37 which develops two signals 180° out of phase with each other and applies them to modulators 35 and 36 through wires 38 and 39, respectively. As illustrated in the drawing, these modulators interrupt the flow of the steady state air entering ducts 19 and 20, causing variation in air pressure to be applied in opposite phase against walls 47 and 46.

The variation in phase is best illustrated by referring to FIG. 3 where the variation in pressure with time is illustrated in trenches 47 and 46. The steady state air is represented by the displacement $P_s$. As modulation commences beginning at $T_1$, it is noted that against wall 47 the pressure has dropped to its minimum amount while the pressure on trenches 46 has reached its maximum amount. As the pressure approaches $T_2$, it is noted that on wall 47 the pressure has dropped from a minimum amount through a null to a maximum amount while the increasing change of pressure on wall 46 has gone from a maximum amount through a null to a minimum amount. The pressure variations can be traced to time periods $T_3$ to $T_5$ in like manner.

A particular type modulation has been illustrated, namely, the type modulator which interrupts the air flow into the plenum chambers. As previously discussed other modulations can be devised and still fall within the spirit and scope of this invention. As an example, a modulation which is attached to each of the plenum chambers can cause a variation in the air escaping to the atmosphere. Furthermore, modulators can be devised which vary the air pressure being directed from one plenum chamber to the other plenum chamber, thereby causing a corresponding cyclic variation which is 180° out of phase in each of the plenum chambers.

In the normal use of a shear wave vibrator 10, a trench is formed in the earth having sufficient depth. A utility crane or specially built vehicle lowers the vibrator by attaching the lifting mechanism to lifting apparatus 50 which is attached to housing 14 which has sufficient strength to support the vibrator. As the vibrator is lowered to the bottom 48 of trench 45, ground engaging means 32 attached to base 31 will embed themselves into the trench bottom. The weight of the vibrator as it is operated will continue to embed ground engaging means 32. The engaging means provides a stable reference for the vibrator so that a 180° opposite phase can be successfully applied to the opposite walls 47 and 46 of trench 45. Once the operation of vibrator 10 is completed, the fans 15 and 16 will be shut off, causing deflation of the skirts 25 and 27. The entire vibrator 10 can then be lifted by lifting apparatus 50, removing same from trench 45.

HYDRAULIC EMBODIMENT

Referring to FIG. 4, a means of accomplishing the above is illustrated using hydraulics and essentially comprises a base plate 60 positioned against wall 46 and a second base plate 61 positioned against wall 47. A hydraulic jack, generally referred to by 62, comprises a cylinder 63 which is attached to base plate 60 or 61. A hydraulic mass 64 has a piston shaft 65 which forms the piston for cylinder 63 and also the piston 66 moving mass 64 horizontally. A standard control valve 67 has an input signal 68 which is generally electrical and a hydraulic supply 69 which is controlled in valve 67 to supply hydraulic fluids under pressure to cylinder 66. A static hydraulic supply line 70 is connected to jacks 62 through valve 71.

The operation of the mass, its control, etc., are clearly illustrated and described in the patent to F. Clynch, U.S. Pat. No. 3,159,233, and will not be further described here.

The hydraulic version of FIG. 4 generally operates as follows:

The device is lowered as described in the previous embodiment by lifting apparatus 50 so that base plates 60 and 61 are below the surface of ground 49. Then static hydraulic supply line 70 is pressured and valve 71 controlled to supply a fixed amount of hydraulic pressure in jacks 62 to force base plates 60 and 61 securely against the side walls 46 and 47. The hydraulic supply is then applied to control valve 67 and input signal 68 is turned on. The hydraulic pressure will then be periodically applied to each side of cylinder 66, causing the mass 64 to oscillate back and forth in the direction of arrows 80. The movement of the mass will cause a reaction against base plates 60 and 61, creating a seismic wave into the sides 46 and 47 of trench 45.

The disadvantage of the system shown in FIG. 4 over the previous air coupled embodiment is that acceleration must be applied to the base plates 60 and 61 in order to create a shear wave in trench walls 46 and 47. The heavier the base plate, the more difficult will be the development of a shear wave. The air coupled vibrator in essence has a weightless base plate; therefore, no problem is exhibited in generating a shear wave into the trench walls 46 and 47.

The particular air cushion apparatus discussed can be modified and still be well within the spirit and scope of this invention.

What I claim is:
1. A shear wave vibrator comprising:
a frame;
first and second oppositely facing plenum chambers secured to said frame, and each having an outer periphery;
first and second skirt means attached around the outer periphery of said first and second plenum chambers, respectively;
means for supplying a volume of air under pressure to said first and second plenum chambers; and
modulation means having first and second outputs communicating with said first and second plenum chambers, respectively, for simultaneously increasing said pressure in one of said plenum chambers and correspondingly decreasing said pressure in the remaining plenum chamber
whereby, when said frame is positioned in a trench so that said plenum chambers are facing opposite sides of said trench and said modulator is operated, pressure variations will be synchronously applied in opposite phase to the opposite walls of said trench.

2. A shear wave vibrator as described in claim 1 wherein said frame has a top and a bottom and wherein anchoring means are attached to the bottom of said frame and wherein support means are attached to the top of said frame.

3. A method of generating a seismic shear wave in a trench having two side walls comprising:

generating a steady state pressure against said side walls and modulating said steady state pressure against said side walls by simultaneously increasing said pressure on one of said walls and correspondingly decreasing said steady state pressure on said remaining side wall whereby pressure variations will be applied to said walls simultaneously and in phase opposition to each other.

4. A method of generating a seismic shear wave as described in claim 3 wherein said steady state pressure is generated by air.

5. A method of generating a seismic shear wave as described in claim 3 wherein said steady state pressure is generated by hydraulic fluid.

* * * * *